US006914021B2

(12) United States Patent
Sidwell

(10) Patent No.: US 6,914,021 B2
(45) Date of Patent: Jul. 5, 2005

(54) FLEXIBLE WALL MATERIAL FOR USE IN AN INFLATABLE STRUCTURE

(75) Inventor: Donald R. Sidwell, Quincy, CA (US)

(73) Assignee: Lockheed Martin Corporation, Palmdale, CA (US)

(*) Notice: Subject to any disclaimer, the term of this patent is extended or adjusted under 35 U.S.C. 154(b) by 0 days.

(21) Appl. No.: 09/915,032

(22) Filed: Jul. 26, 2001

(65) Prior Publication Data

US 2001/0041486 A1 Nov. 15, 2001

Related U.S. Application Data

(63) Continuation-in-part of application No. 09/206,732, filed on Dec. 7, 1998.

(51) Int. Cl.[7] .......................... B32B 5/26; B32B 27/12; B32B 27/04
(52) U.S. Cl. ..................... 442/239; 442/149; 442/255; 442/261; 442/263; 442/286; 442/287; 428/105; 428/107; 428/112; 428/113; 428/119
(58) Field of Search ................................ 442/181, 239, 442/255, 263, 286, 287, 149, 254; 428/105, 107, 112, 113, 119

(56) References Cited

U.S. PATENT DOCUMENTS 4,801,491 A * 1/1989 Tanaka et al. ............... 428/212
4,937,136 A * 6/1990 Coombs ...................... 442/247

* cited by examiner

Primary Examiner—Ula C. Ruddock
(74) Attorney, Agent, or Firm—Alan G. Towner, Esq.; Pietragallo, Bosick & Gordon

(57) ABSTRACT

This invention relates to airships, with a volume of 15 to 60 million cubic feet of Helium. More particularly, it relates to improved structural envelope/gas bags or outer covers for lighter-than-air and neutral buoyancy airships. In detail, the material is a multi-layer cloth assembly including at least two plies of fiber cloth, said cloth comprising 56 by 56 yarns/inch with a total weight of 150 to 450 g/m$^2$, with the fiber of the individual cloth layers having a denier generally between 180 and 280 and with the fill of the individual plies at 90 degrees to each other. Preferably, the filaments should be between 200 and 215 denier. The fibers of each layer of cloth are selected from the group consisting of extended chain polyethylene polymer or a thermotropic liquid (melt spun) crystalline polymer. The extended chain polyethylene fiber is a woven modified rip stop weave architecture, while the thermotropic liquid (melt spun) crystalline polymer fiber is a 2×2 basket weave architecture.

9 Claims, 4 Drawing Sheets

FLEXIBLE WALL MATERIAL FOR USE IN AN INFLATABLE STRUCTURE

CROSS REFERENCE TO RELATED APPLICATIONS

This application is a continuation-in-part of U.S. patent application Ser. No. 09/206,732, filed Dec. 7, 1998 to Donald Sidwell.

BACKGROUND OF THE INVENTION

The structural envelope/gas bags laminate is composed of 2 to 6 plies of a 2 by 2 basket (56 by 56 yarns/inch) weave with thermotropic liquid (melt spun) crystalline polymer fiber. An optical structural envelope/gas bag laminate is composed of 2 to 6 plies of a Modified Rip Stop (58 by 58 yarns/inch) weave with extended chain polyethylene fiber. Both candidate materials are laminated to an amorphous, thermoplastic polyurethane (TPUR) elastomer film between each ply, providing the structural integrity of the composite laminate in addition to providing a gas barrier, weatherability and wear resistance. A biaxial fabric or resin film is not required to achieve the following strengths: Tensile strength 453 to 3500 kg/5cm, Tear strength 400 to 1633 kg and a base cloth weight of 277 to 742 g/m$^2$. Conventional airships and aerostats are produced utilizing a biaxial ply to achieve increased tear strength from a composite skin (envelope/gas bag).

In large volume, in excess of 15 to 60 million cubic feet of Helium, the material used for the envelope/gas bag of non-rigid airships must meet a large number of design requirements such as high strength, provide tear resistance, act as a gas barrier, not be subject of degradation by ultra violet radiation due to exposure to sunlight, and must resist wind erosion. Thus such a material winds up being a multi-layer laminate combining materials with diverse properties. The tension stress loads on any portion of the wall of the envelope/gas bag are at 0 degrees to the longitudinal axis of the envelope/gas bag or 90 degrees thereto (circumferential) hereinafter referred to as axial loads. Thus most laminates include woven filamentary material with the filamentary material orientated at 0 to 90 degree angles. Additionally, to absorb shear stress loads, filamentary material is often included with orientations at plus or minus forty-five degrees to those absorbing the axial tension loads.

In early designs, where stress levels were low, several layers of woven cotton cloth impregnated with rubber to provide the gas seal were often used. The layers of cotton cloth were at 0 and 90 degrees (axial plies) for the tension loads and plus and minus 45 degrees (bias plies) for the shear loads. Later artificial polyester fibers were used. However, this approach did not result in an optimal design for the strength required to absorb the axial loads which was typically much greater than that required for the bias plies loaded in shear. Using the same material for absorbing both the axial tension loads as well as the bias (shear) loads often resulted in a weight penalty.

Some modern designs use woven polyester fiber as the axial load carrying material, in addition to a polyester terephthalate film, which provides a Helium gas barrier and absorbs shear loads. However, in large non-rigid airships with volume in excess of 15 to 60 million cubic feet of Helium, the strength requirements have dictated the use of very high strength materials such as an extended chain polyethylene fiber or a thermotropic liquid (melt spun) crystalline polymer fiber.

In the past, it was believed that for large non-rigid airships with a volume in excess of 15 to 60 million cubic feet of Helium, such material had to have deniers of around 3000, thus the threads had a diameter on the order of $3/16$ of an inch. If the bias plies where made of the same material, 0 and 90 degree axial loads will be transferred to the forty-five degree bias plies requiring these plies to be stronger than if they were only required to absorb shear loads. Thus it was important to have as large a strain value at failure as possible in the bias plies in order to provide tear resistance when using such high denier cloth.

U.S. Pat. No. 6,074,722, "Flexible Material For An Inflatable Structure" by R. S. Cuccias, filed Feb. 2, 1997 disclosed a material wherein bias shear load carrying plies had a greater strain to failure value than the axial tension load carrying. The invention included a first flexible layer comprising unidirectional filamentary material at 0 to 90 degrees to each other. A second flexible layer was included having unidirectional filamentary material at 0 to 90 degrees to each other and at forty-five degrees in the filamentary material of the first layer. Critical to the invention was the requirement that the strain value at failure for the filamentary material of the second layer be greater than the 0 and 90 degree filamentary material of the first layer. Of course, the first and second layers were bonded together by a resin, and an additional film as a gas impermeable material and an ultra violet radiation resistant material were bonded to the first two layers. However, such materials are difficult to manufacture accurately with plies at both 0 and 90 degrees and at plus or minus 45 degrees.

However, not addressed by the prior art is a envelope/gas bag material for a very large non-rigid airship with a volume in excess of 15 to 60 million cubic feet of Helium, incorporating only one structural cloth material that eliminates the need for 45 degree plies, that is light in weight, and does require a separate Helium barrier.

SUMMARY OF THE INVENTION

A flexible wall material for use in an airship with a volume in excess of 15 to 60 million cubic feet of Helium. In detail, the material is a multi-layer cloth assembly including at least two plies of fiber cloth, with the fiber of the individual cloth layers laying a denier generally between 180 to 280 with the fill of the individual plies at 90 degrees to each other and a total weight of between 150 to 478 g/m$^2$. The permeability is less than 1 liter/m$^2$/day/atm. Preferably, the material has a weight of 150 to 450 g/m$^2$ and an architectural weave comprising 56 by 56 yarns/inch. An optional structural envelope/gas bag laminate is composed of 2 to 6 plies of a modified Rip Stop (58 by 58 yarns/inch) weave with extended chain polyethylene fiber and having a total weight of 159 to 478 g/m$^2$. VECTRAN fibers made by Celanese Acetate LLC of Charlotte, N.C. and SPECTRA fibers made by Honeywell Performance Fibers of Morristown, N.J. are applicable materials. Both candidate materials are laminated to an amorphous, thermoplastic polyurethane (TPUR) elastomer film between each ply providing the structural integrity of the composite laminate in addition to providing a gas barrier, weatherability and wear resistance.

Preferably, the denier is between 180 and 215. The fibers of each layer of cloth are selected from the group consisting of an extended chain polyethylene fiber or a thermotropic liquid (melt spun) crystalline polymer fiber. The extended chain polyethylene fiber has modified rip stop weave architecture, while the thermotropic liquid (melt spun) crystalline polymer fiber preferably has a 2×2 basket weave architecture. A film providing ultraviolet radiation protection is bonded to the outer side of the material assembly. The preferred ultra-violet protective film is made from a polyester terephthalate material.

One particular application is for a very large non-ridged airship with a volume in excess of 15 to 60 million cubic feet of Helium, which includes an envelope/gas bag having a gondola attached to the bottom thereof. The material of the envelope/gas bag includes at least two plies of fiber cloth, with the fiber of the cloth having a denier generally between 195 and 215 with the fill of the individual plies at 90 degrees to each other. The fibers of the cloth are selected from the group consisting of extended chain polyethylene fiber or thermotropic liquid (melt spun) crystalline polymer fibers.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
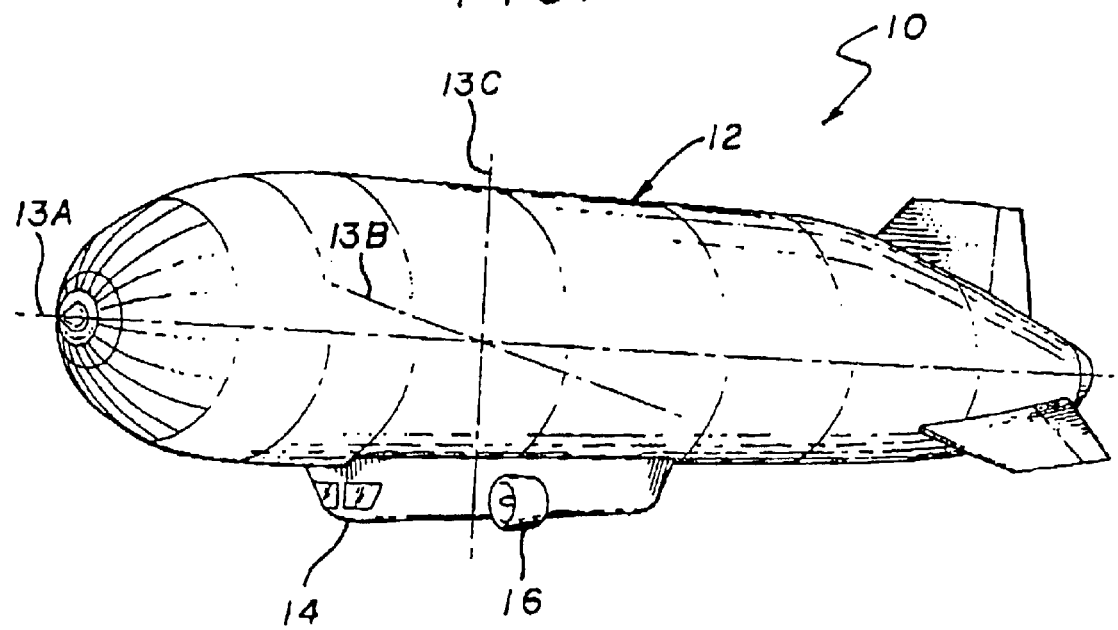
FIG. 1 is a perspective view of the lighter-than-air vehicle.

Illustrated in FIG. 1 is a perspective view of very large non-rigid airship with a volume in excess of 15 to 60 million cubic feet of Helium, generally designated by the numeral 10. The vehicle 10 includes an envelope/gas bag 12 having a longitudinal axis 13A, lateral axis 13B and a vertical axis 13C. It should be understood that the vehicle 10 could be constructed from a series of separate envelope/gasbags joined together to form the illustrated shape. A gondola 14 is suspended from the envelope/gas bag 12 and incorporates a plurality of propulsion systems 16 mounted thereon. If the vehicle is very large, enormous stress levels can be introduced into the envelope/gas bag 12.

Additionally, the envelope/gas bag 12 must be impervious to Helium gas; not be affected by ultra-violet radiation; and capable of being seamed together from a large number of panels. Meeting all these requirements requires a laminated multi-layer flexible cloth assembly having specific mechanical properties.

Figure 2:
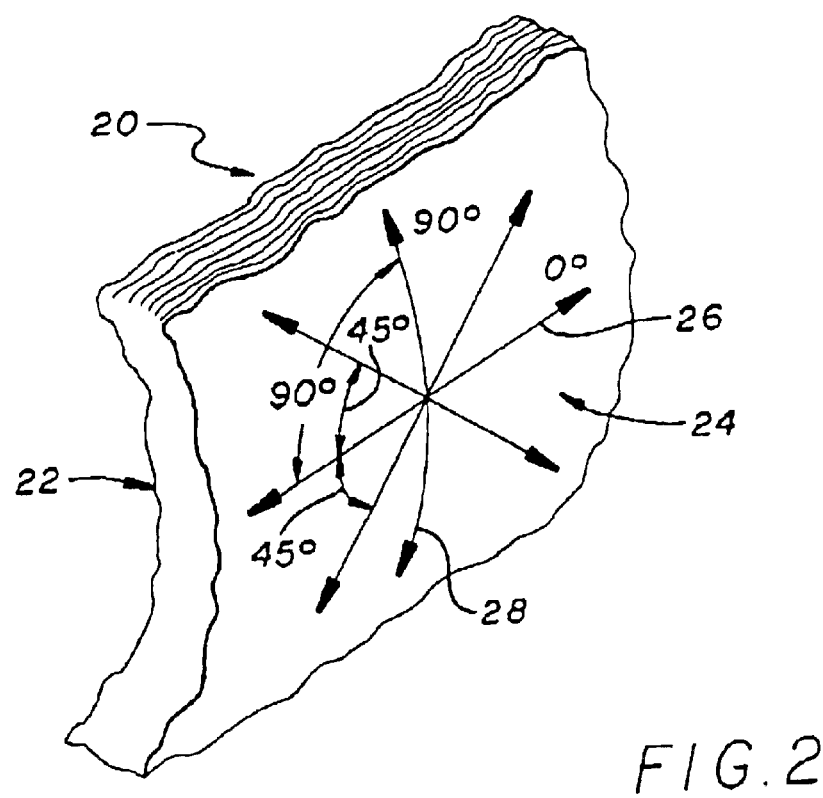
FIG. 2 is a perspective view of a portion of the wall of the envelope/gas bag made of the subject multi-layer cloth assembly.

In FIG. 2, a portion of the envelope/gas bag 20 is illustrated having an inside surface 22 and outside surface 24 and is composed of multiple layers of filamentary material in a manner to be subsequently discussed. The main stress loads are introduced along the 0 degree axis, aligned with the longitudinal axis 13A, and indicated by numeral 26, and 90 degrees thereto indicated by numeral 28. Thus the main load carrying filamentary material should be aligned with these axes.

Figure 3:
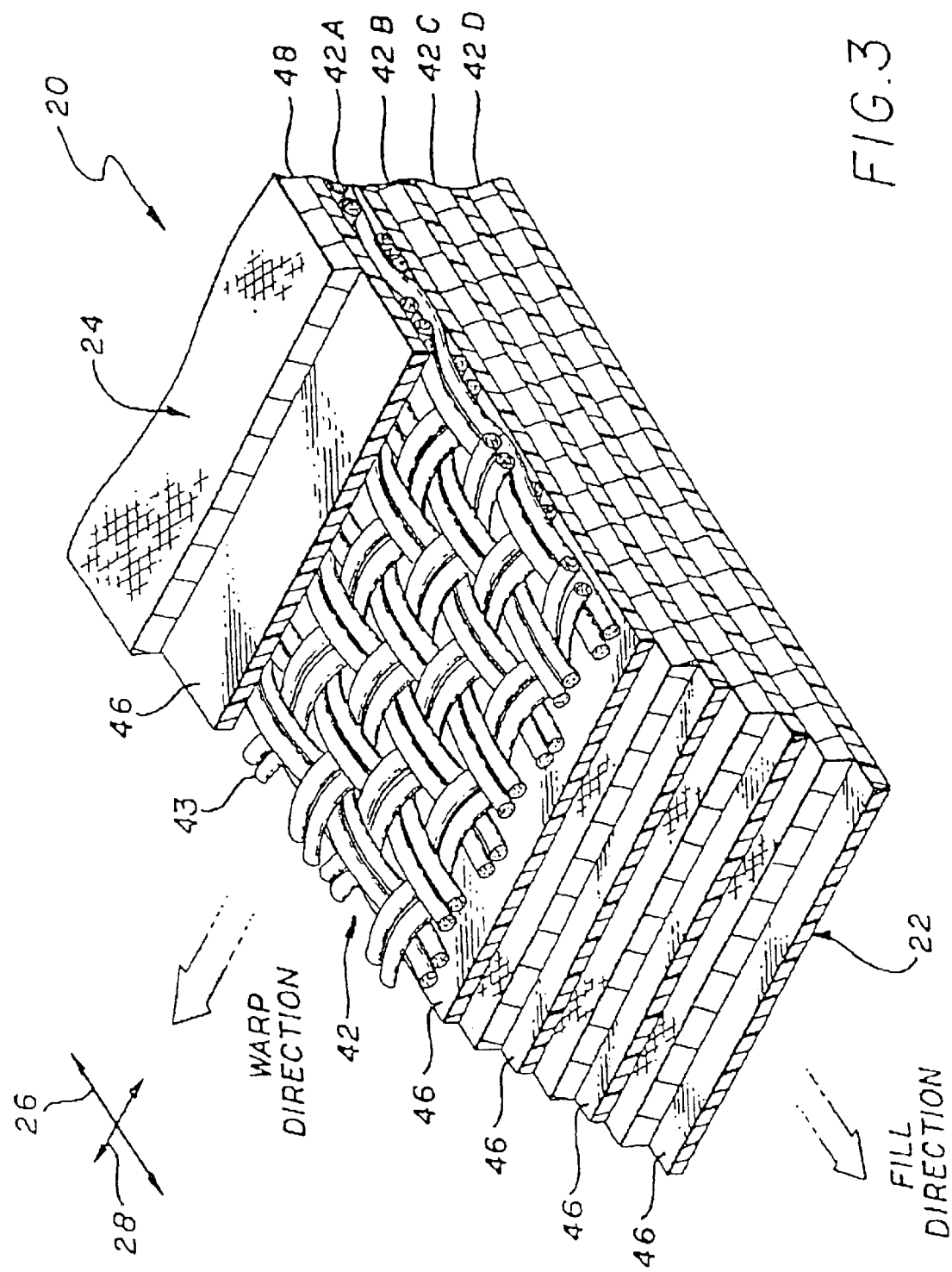
FIG. 3 is a perspective view of a four-ply envelope/gas bag (wall) shown in FIG. 2 with the individual plies having a 2×2 basket weave.

Referring to FIG. 3 the envelope/gas bag 20 is made by forming a stack 42 by laying up four layers of woven cloth 42A, 42B, 42C, and 42D, with the threads 43 of each layer woven in a 2×2 basket weave architecture. The denier of the cloth is between 180 and 280 and, preferably between 200 and 215. The threads 43 of the layers 42 are made of a thermotropic liquid (melt spun) crystalline polymer fiber. The fill of each layer 42A–D alternates between 0 and 90 degrees to each other layer. Resin sheets 46 are placed on the inside and outside surfaces 22 and 24 of the layers 42 and also between each layer 42A–D. The resin sheets are preferably made from a thermoplastic polyurethane (TPUR) elastomer, because the envelope/gas bag 20 is a gasbag for a non-rigid lighter-than-air ship 10. A fifth layer 48 of a material that is resistant to degradation by ultra violet radiation such as a polyester terephthalate is bonded to the outside surface 24. As illustrated in FIG. 3, the material is illustrated in its "lay-up form" for purposes of illustration. When the layers are bonded together, the sheets of resin 46, flow together and impregnate the layers of cloth 42A–D. Thus the layers 42A–D can be said to be encapsulated in a resin matrix and the envelope/gas bag 20 can be characterized as a flexible composite material.

Figure 4:
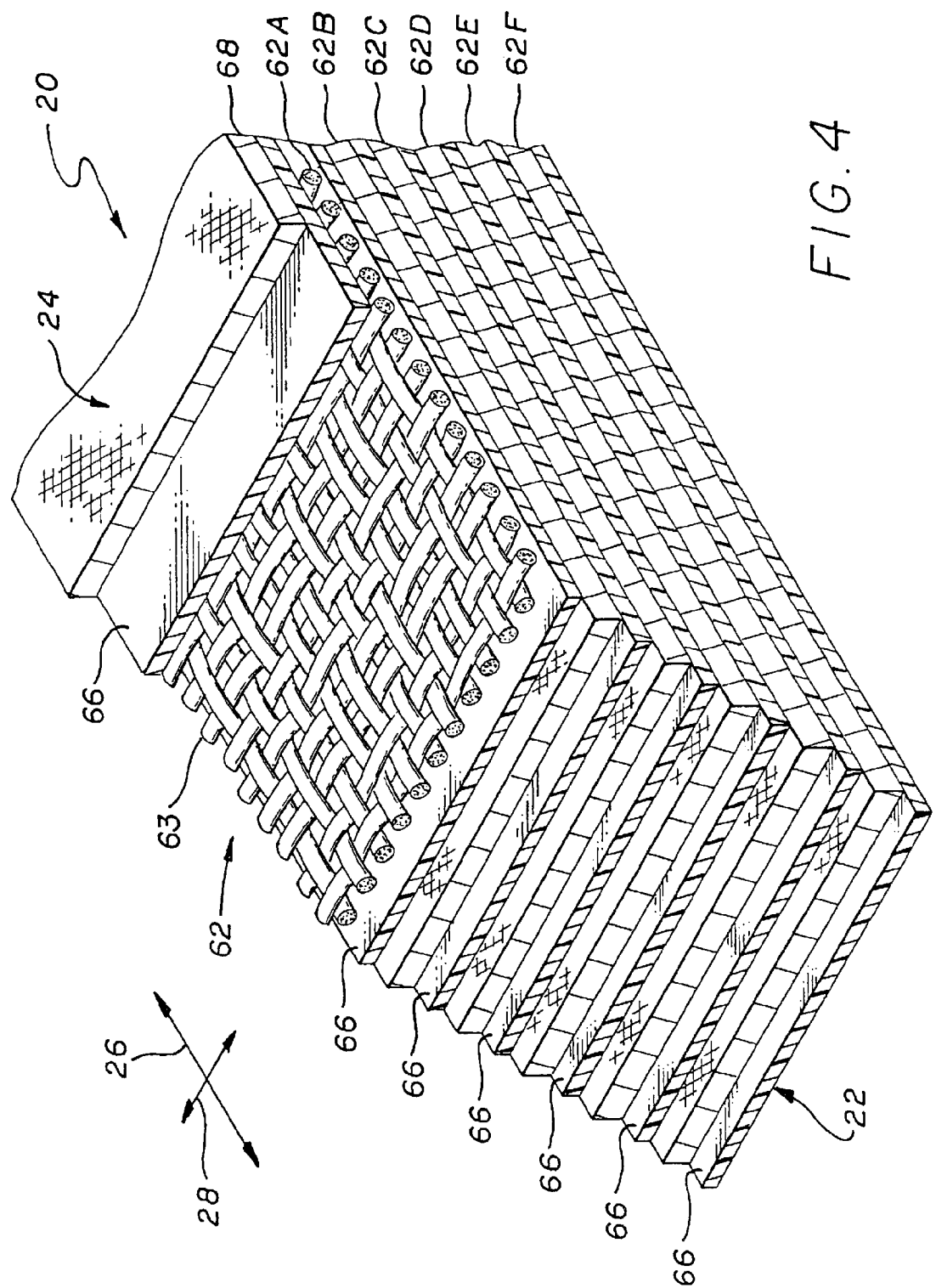
FIG. 4 is a perspective view similar to FIG. 3 except illustrating a six-ply wall with the individual plies having a modified rip stop weave.

Referring to FIG. 4, in a second embodiment, the envelope/gas bag 20 is made from forming a stack 62 by laying up to six layers of woven cloth 62A, 62B, 62C, 62D, 62E and 62F, with the threads 63 of each layer woven in a modified rip stop weave architecture. Again the denier is between 180 and 280 with the preferred range of 180 to 215. As illustrated, the threads 63 are made of extended chain polyethylene. The fill of each layer 62A–F alternates between 0 and 90 degrees to each other. Resin sheets 66 are placed on the inside and outside surfaces 22 and 24 of the stack 62 and also between each layer 62A–F. The resin sheets 66 are also preferably made from polyurethane elastomer resin. A seventh layer 68 of a material that is resistant to degradation by ultra violet radiation is bonded to the outside surface 24, again a polyester terephthalate film. The envelope/gas bag 20 is again illustrated in its "lay-up form" for purposes of illustration. As in the previous example, when the layers are bonded together, the sheets of resin 66, flow together and impregnate the layers of cloth 62A–F. Thus again, the layers can be said to be encapsulated in a resin matrix and the envelope/gas bag 20 can be characterized as a flexible composite material.

Figure 5:
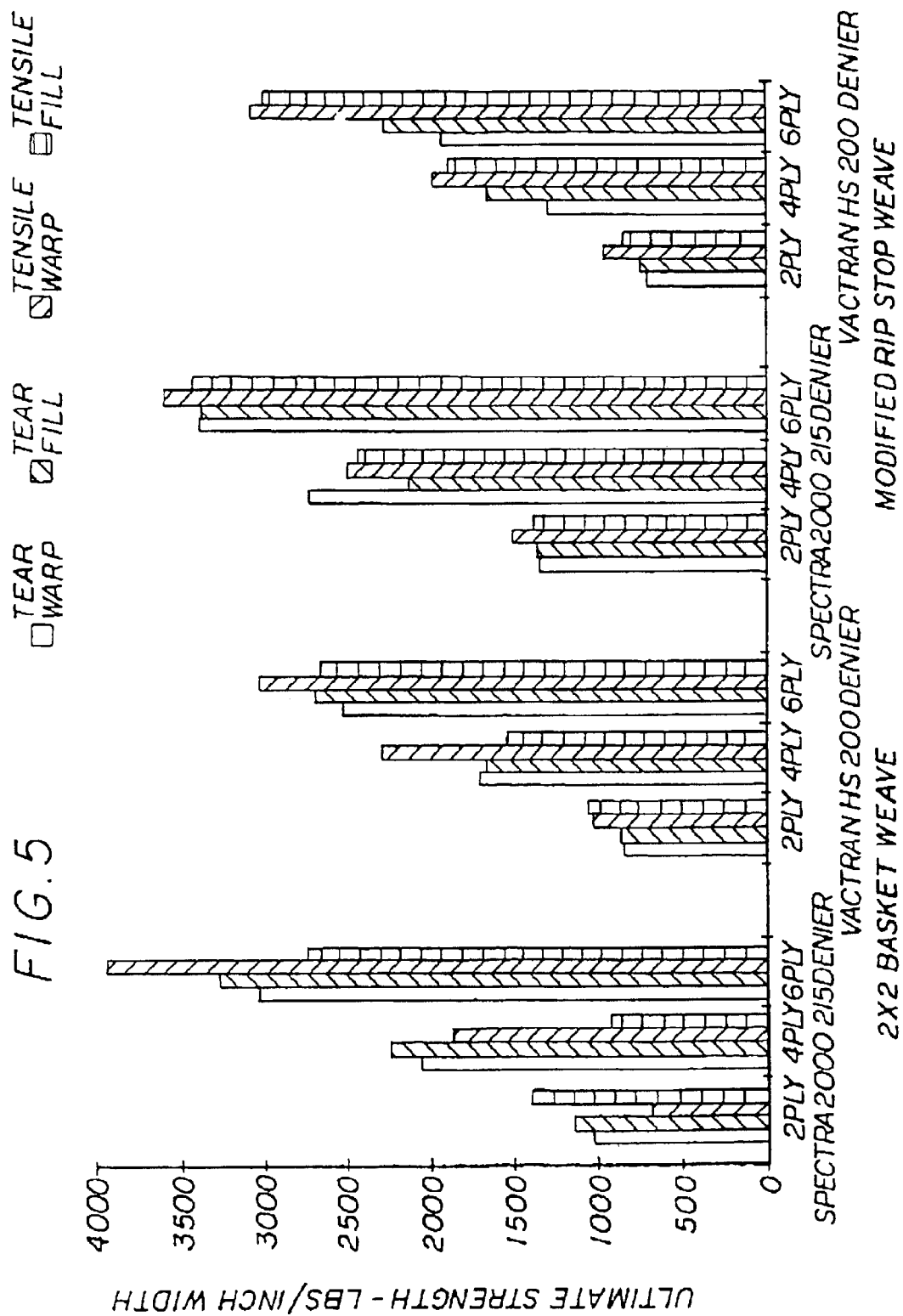
FIG. 5 is a bar chart plotting the ultimate strength of multi-layer cloth assembly versus the number of plies.

Referring to FIG. 5, which is a bar chart comparing the ultimate strength of multi-layer cloth assembly versus the number of plies, the ultimate strengths in warp and fill tear strengths and warp and fill tensile strengths are generally equal. This eliminates the need for plies at plus or minus 45 degrees to absorb shear loads. In addition, a six ply material has a thickness of only 0.035 inch, and it is flexible and crease resistant.

High denier cloth or low denier cloth with plain, 4 harness satin or 4×4 basket weaves produce either low strength levels or wide variations in warp and fill tear and tensile strengths making them inefficient. For example, low denier plain and 4×4 basket weaves produce good tensile strengths but tear and warp strengths are reduced over 60 percent and 40 percent, respectively. With a low denier 4 harness satin weaves, tear and tensile strengths are reduced about 40 percent. With the plain weave the warp and fill shear values are down below 40 percent of the warp and fill tensile values. A single ply of these materials with the preferred denier range also does not produce generally equal warp and fill tear and tensile strengths because fill and warp strengths are not equal. Thus is clear from the chart that there is synergistic effect when using two or more plies of extended chain polyethylene fiber with a modified rip stop weave and a thermotropic liquid (melt spun) crystalline polymer fiber with a 2×2 basket weave, and the low denier numbers, In conclusion, the subject materials provide a unique material particularly suitable for inflatable structures, especially those requiring high strength, such as a very large non-ridged airship with a volume in excess of 15 to 60 million cubic feet of Helium.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the composites industry and also to the aircraft industry.

What is claimed:

1. A helium impervious material for a wall of a flexible pressurized container comprising at least two plies of cloth, said cloth having a weight of 150 to 450 g/m$^2$, said cloth comprising fiber having a denier generally between 180 and 280 and the fill of the individual plies at 90 degrees to each other, said fibers of said cloth selected from the group consisting of extended chain polyethylene polymer in a rip stop weave architecture and a thermotropic liquid crystalline polymer in a 2×2 basket weave architecture.

2. The material as set forth in claim 1, wherein said plies are joined together by a thermoplastic polyurethane elastomer resin.

3. The material as set forth in claim 2, wherein said plies are joined together by a polyester terephthalate film bonded to the outer side of said material.

4. The material as set forth in claim 1, wherein said cloth has a weight of 159 to 478 g/m$^2$ and said weave comprises 58 by 58 yarns/inch.

5. The material as set forth in claim 1, wherein the denier is between 180 and 215.

6. The material as set forth in claim 1, wherein the weave comprises 56×56 yarns/inch.

7. The material as set forth in claim 1, wherein the fibers comprise the thermotropic liquid crystalline polymer in a 2×2 basket weave architecture and wherein the material has an ultimate tensile strength of at least 800 lbs/inch width.

8. The material as set forth in claim 1, wherein the fibers comprise the extended chain polyethylene polymer in a rip stop weave architecture and wherein the material has an ultimate tensile strength of at least 600 lbs/inch width.

9. The material as set forth in claim 1, having a permeability of less than 1 liter/m$^2$/day/atm of helium.

* * * * *